Patented Sept. 26, 1922.

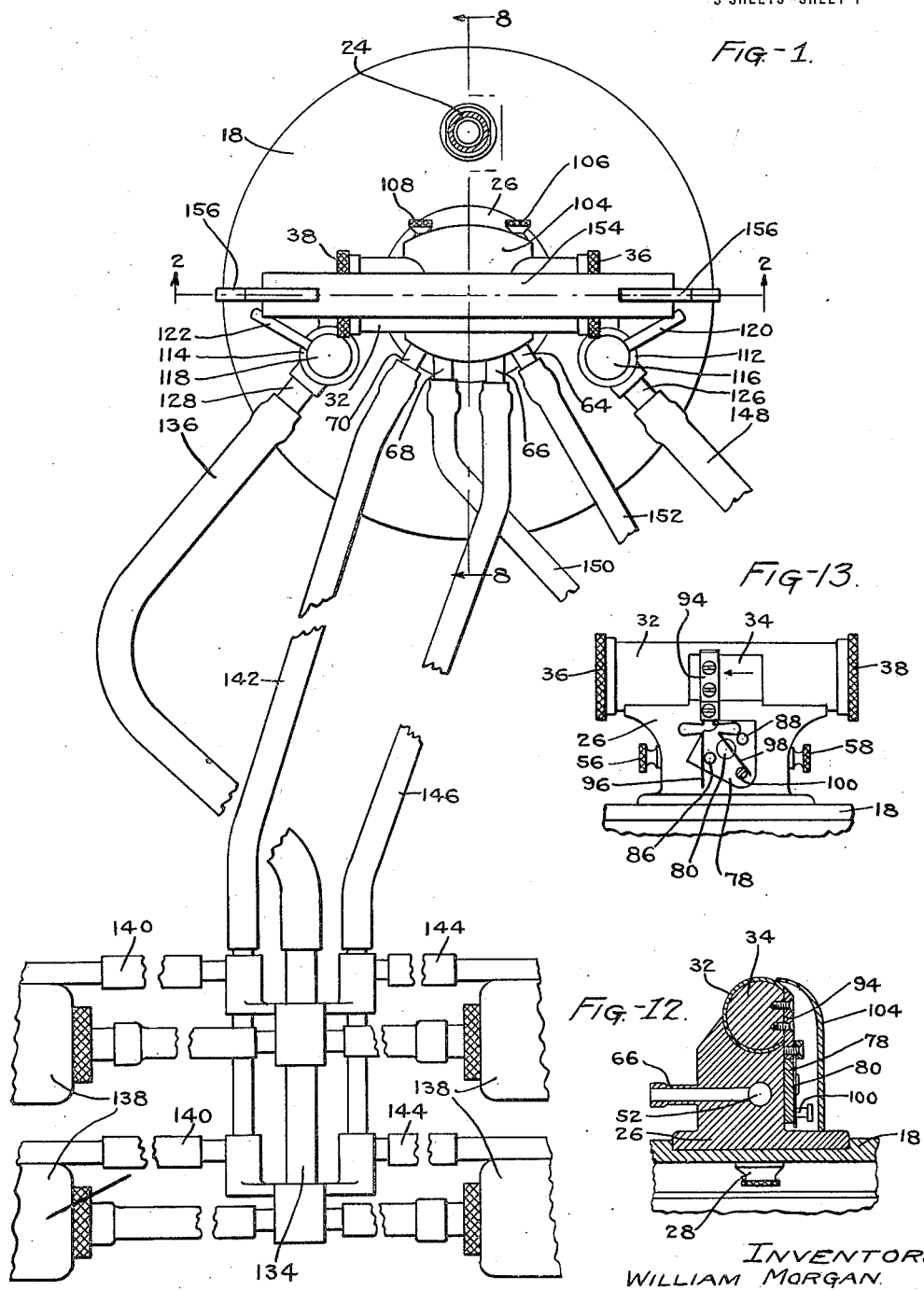

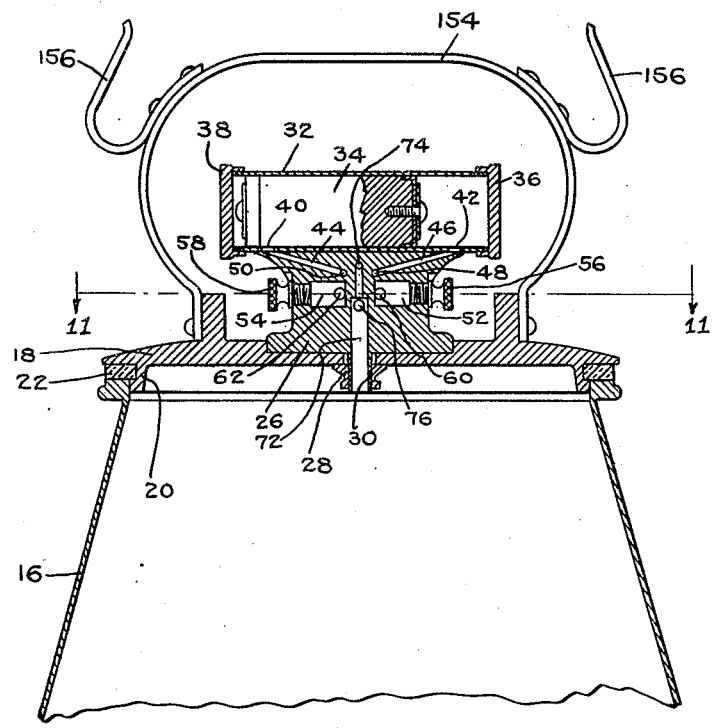
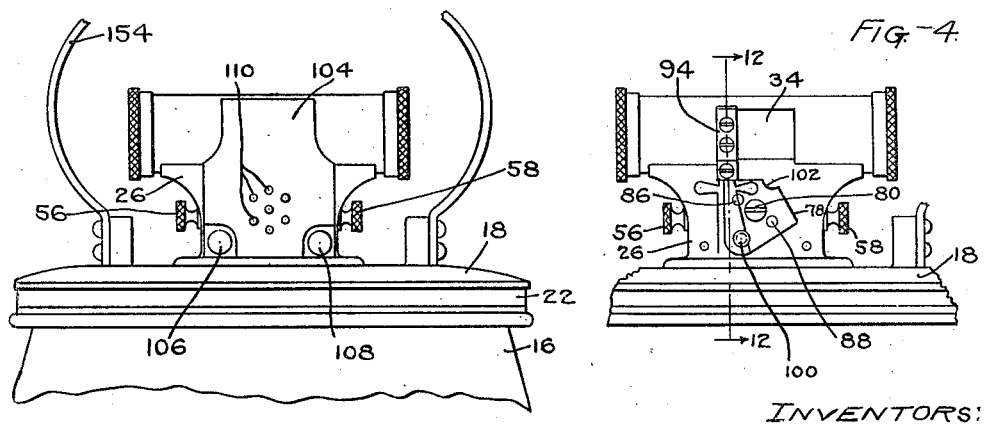

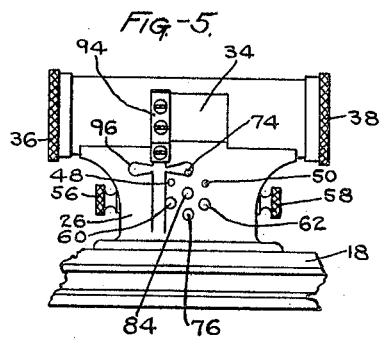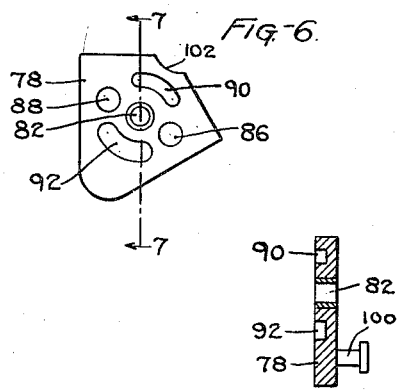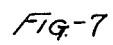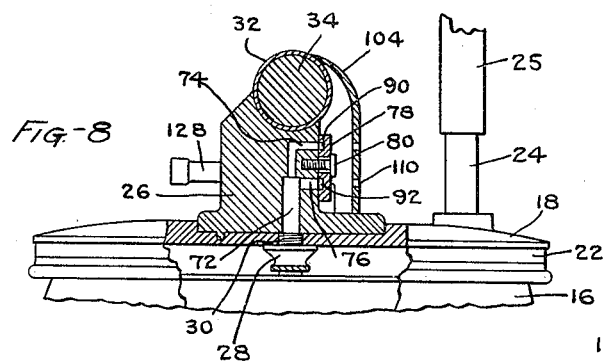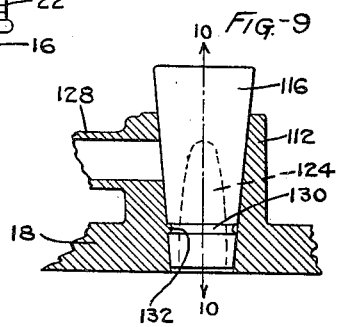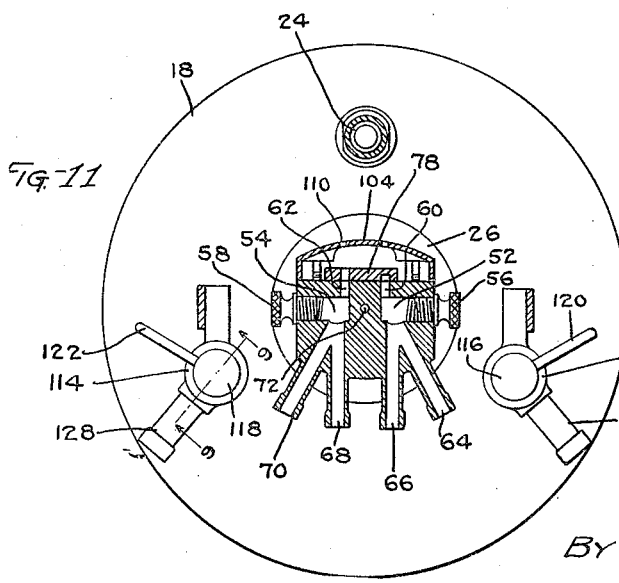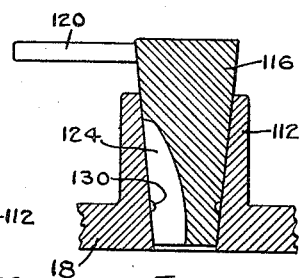

1,430,022

UNITED STATES PATENT OFFICE.

WILLIAM MORGAN, OF MINNEAPOLIS, AND CLARENCE J. MUCKLE, OF ST. PAUL, MINNESOTA, ASSIGNORS, BY MESNE ASSIGNMENTS, TO INDEPENDENT MILKING MACHINE COMPANY, A CORPORATION.

MILKING APPARATUS.

Application filed November 22, 1920. Serial No. 425,740.

*To all whom it may concern:*

Be it known that we, WILLIAM MORGAN and CLARENCE J. MUCKLE, citizens of the United States, residing, respectively, at Minneapolis, in the county of Hennepin, State of Minnesota, and at St. Paul, in the county of Ramsey and State of Minnesota, have invented certain new and useful Improvements in Milking Apparatus, of which the following is a specification.

Our invention relates to milking apparatus, and has for an object to provide apparatus by means of which a substantially constant degree of vacuum is maintained in the milk-pail or receptacle into which the milk is drawn from cows. Our invention relates more particularly to mechanism for producing pulsations in connection with the closed compartment or double-chamber style of teatcup, and a further object is to provide pulsating mechanism by means of which the milk from two cows at a time may be drawn into a single pail or receiver. Other objects are to provide an efficient form of reversing valve and milk-cocks.

The full objects and advantages of our invention will appear in connection with the detailed description thereof, and the novel features embodied in our inventive idea will be particularly pointed out in the claims.

Referring to the accompanying drawings which illustrate a practical embodiment of our invention, Fig. 1 is a top plan view of the apparatus; Fig. 2 is a view in vertical section on the line 2—2 of Fig. 1; Fig. 3 is a front elevational view; Fig 4 is a view similar to Fig. 3 but with the valve protecting cover removed; Fig. 5 is a view similar to Fig. 4 but with the valve removed; Fig. 6 is a rear elevational view of the valve; Fig. 7 is a view in vertical section on the line 7—7 of Fig. 6; Fig. 8 is a view in vertical section on the line 8—8 of Fig. 1; Fig. 9 is a view in vertical section on the line 9—9 of Fig 11; Fig. 10 is a view in vertical section on the line 10—10 of Fig. 9; Fig. 11 is a view in horizontal section on the line 11—11 of Fig. 2; Fig. 12 is a view in vertical section on the line 12—12 of Fig. 4; Fig. 13 is a view similar to Fig 4 but showing the valve moved into a different position.

Referring to the particular construction shown in the drawings, the numeral 16 designates a milkpail which is provided with a removable cover 18 having a flange 20 adapted to fit into the top of the pail, an airtight joint between the cover and the pail being formed by means of a rubber gasket 22, as will appear from Fig. 2. A short tube or nipple 24 is screwed into the cover so as to establish communication with the interior of the pail, and this nipple is connected by a flexible tubing 25 with any suitable suction device such as a vacuum tank and pump, it being understood that any desired number of milking machines may be connected by flexible tubing such as 25 to a pipe leading to the vacuum device. A base member 26 is removably attached to the cover 18 by means of a thumb nut 28 adapted to be screwed upon an externally threaded hollow projection 30 which extends through a hole in the cover, as best shown in Figs. 2 and 8. A horizontal cylinder 32 is secured upon the base member 26, and this cylinder is provided with an elongated piston 34 which may be introduced into and removed from the cylinder upon removing screw caps 36 and 38 with which the ends of the cylinder are fitted. The cylinder near its ends is provided with holes 40 and 42, connected, respectively, with the ducts 44 and 46 which, in turn, are connected to ducts 48 and 50 opening out through the front of the base member 26, as best shown in Fig. 5. In the base member 26 are chambers 52 and 54 closed at their outer ends by screw plugs 56 and 58. Ducts 60 and 62 lead from the chambers 52 and 54, respectively, out through the front of the base portion. The chamber 52 communicates with a pair of nipples 64 and 66, while the chamber 54 communicates with a pair of nipples 68 and 70. The hollow projection 30 previously mentioned connects with a central vertical chamber 72 from which ducts 74 and 76 open out through the front of the base member 26. An oscillatory valve 78 is pivotally mounted by means of a screw 80 extending through a hole 82 in the valve and into a screwthreaded opening 84 in the base member. This valve is provided with two holes 86 and 88. When the valve is in one extreme position as shown in Fig. 4, the hole 88 registers with the duct 62 and the hole 86 registers with the duct 48. When the valve is in the other extreme position as shown in Fig. 13, the hole 88 registers with the duct 50 and the hole 86 registers with the duct 60. The valve is provided upon its rear with an upper segmental recess 90 and a lower segmental recess 92. When the valve is in the position shown in Fig. 4, the recess 90 connects the ducts 74 and 50 and the recess 92 connects the ducts 76 and 60. When the valve is in the position shown in Fig. 13, the recess 90 connects the ducts 74 and 48 and the recess 92 connects the ducts 76 and 62. The valve is oscillated by means of the movement of the plunger 34 in the following manner. Secured to the plunger 34 and capable of sliding in a slot in the cylinder is a projection or strip 94, to the lower end of which is secured a spring having two downwardly extending branches 96 and 98 which straddle a lug 100 which extends out from the lower portion of the valve 78. As shown in the drawings the branches or arms 96 and 98 adjacent their points of attachment are bowed away from each other to provide greater resiliency. When the piston moves from right to left and is approaching its extreme left hand position, as shown in Fig. 13, the branch 98 of the spring causes the valve to oscillate into the position shown in Fig. 4. The engagement of the lower end of the strip 94 with the upper edge of the valve prevents movement of the latter until the strip 94 is at about the position shown in Fig. 13 which places the branch 98 of the spring under tension so that as soon as the strip 94 reaches the cutout portion 102 in the valve the latter is released and the spring member 98 moves the valve with a quick snappy action into the position shown in Fig. 4. When the piston moves from left to right, the spring member 96 moves the valve in similar manner into its other extreme position. In order to protect the valve, a cover 104 is provided which is held in place by thumb screws 106, 108. The cover is provided with holes 110 for the passage of air. The milkpail cover is provided with a pair of sockets 112 and 114 which open through the cover into the interior of the pail. The interior walls of these sockets are tapered to receive tapered plugs or cocks 116, 118 provided with handles 120 and 122 by means of which they may be turned to bring recesses 124 into and out of register with nipples 126 and 128 which are secured to the sockets. Each of the plugs is provided with a peripheral groove 130 near its lower end which cooperates with a projection 132 located within the socket below the nipple as shown in Fig. 9. From this figure, it is obvious that when the plug is turned so that its recess is out of register with the nipple, the plug is held in place, and when the recess registers with the nipple, the plug may be removed from its socket. A pair of claws, such as the claw shown at the lower left hand portion in Fig. 1, is provided, and since these claws are alike, a disclosure of one of them is sufficient. The claw has a central tube 134 which is connected by a flexible hose 136 with the nipple 128. The tube 134 has four branches which are connected with the four teatcups 138 employed for milking one cow. These teatcups are of well known construction having an inner chamber and an outer chamber formed by a flexible lining, preferably of rubber within a rigid casing, the outer chamber being located between the casing and the lining. The inner chambers of the teatcups are connected with the central tube 134 so as to be constantly subjected to the vacuum in the milkpail when the plug 118 is in such position that its recess registers with the nipple 128. The outer chambers of two of the teatcups are connected by branch tubes 140 to a flexible hose 142 which is attached to the nipple 70 leading to the chamber 54, and the outer chambers of the other two teatcups of the set are connected to a flexible hose 146 which is attached to the nipple 66 leading to the chamber 52. The inner chambers of another set of four teatcups are similarly connected to a flexible hose 148 leading to the nipple 126, and the outer chambers of these teatcups are connected by the hose lines 150 and 152 to the nipples 68 and 64, it being understood that a claw device similar to that previously referred to is used for this purpose. The cover 18 of the milkpail is provided with a handle or bail 154 to which are attached hooks 156 upon which the hose lines may be supported when not in use.

The operation and advantages of our invention will be understood from the foregoing description. The interior of the milkpail and the chamber 72 are maintained under the vacuum by suction through the nipple 24 and its connections as long as the device is in operation. The piston is caused to reciprocate on account of the fact that one end of the cylinder is under vacuum through the ducts 46 and 48, the recess 90 and the duct 74 connected to the chamber 72 at the same time that the other end of the cylinder is subjected to air pressure through the ducts 44 and 50 and the hole 88 in the valve. This is the position shown in Fig. 13. When the valve has been oscillated into the position shown in Fig. 4, the condition of vacuum and air pressure in the ends of the cylinder is reversed. When the valve is in the position shown in Fig. 13, the chamber 52 is subjected to air pressure through the duct 60 and the hole 86 in the valve while the chamber 54 is under vacuum through the duct 62, the recess 92 and the duct 76. When the valve has been oscillated into the position shown in Fig. 4, the condition of vacuum and air pressure in the chambers 52 and 54 is reversed. Assuming the chamber 52 to be subjected to air pressure and the chamber 54 to be under vacuum, then, by means of the nipples 64 and 66 and connections leading to the teatcups, the outer chambers in two of the teatcups in each set will be subjected to air pressure, and, by means of the nipples 68 and 70, the outer chambers in the other two teatcups of each set will be subjected to vacuum. When the valve has been moved into its other position, then the condition of the vacuum and air pressure in the outer chambers of the two sets of teatcups is reversed. It will thus be apparent that the inner chambers of the teatcups which receive directly the teats are subjected to constant suction, and that the chambers outside the flexible members of the teatcups are subjected alternately to air at atmospheric pressure and suction. During the former condition, the teats are subjected to a squeezing action, and during the latter condition the inward pressure is released on account of the suction in the inside and outside of the flexible lining being equalized. It is obvious from the description of the connections shown in Fig. 1, that the milk from two cows will be drawn into a single receptacle, and that two of the teats of each cow are subjected to squeezing action at the time when the other two are released, the squeezing action and the releasing action being alternated in accordance with the pulsations produced by the reciprocation of the piston and the oscillation of the valve. When the milking operation has been completed, the plugs 116 and 118 are turned so that their recesses 124 no longer register with the nipples 126 and 128. When thus turned, the peripheral groove 130 is engaged by the lug 132 and the plugs are kept from being lost out of their sockets while the pail is being carried. When the apparatus is not in use, it is an easy matter to remove the plugs for cleaning upon turning them so that the lug 132 is located in the gap in the peripheral groove caused by the recess 124.

We claim:

1. A milking apparatus comprising a milk receptacle, teatcups adapted to be connected with said receptacle, a cylinder, a piston in said cylinder, an oscillatory valve mounted adjacent said cylinder, a projection attached to said piston and slidable in a slot in said cylinder, said projection being adapted to hold said valve alternately in its extreme positions until said piston approaches the ends of its stroke, two spaced arms having resilient action and mounted to reciprocate with said piston and straddling a projection on said valve, and means controlled by said valve for causing pulsations in said teatcups.

2. A milking apparatus comprising a milk receptacle, teatcups adapted to be connected with said receptacle, a cylinder mounted on said receptacle, a piston in said cylinder, an oscillatory valve mounted adjacent said cylinder and having two locking surfaces separated by a release opening, a projection attached to said piston and slidable in a slot in said cylinder, said projection being adapted to engage said locking surfaces alternately until said piston approaches the ends of its stroke, two spaced arms having resilient action and mounted to reciprocate with said piston and straddling a projection on said valve, and means controlled by said valve for causing pulsations in said teatcups.

3. A milking machine comprising a milk receptacle, teatcups adapted to be connected with said receptacle, a cylinder mounted on said receptacle, a piston in said cylinder, an oscillatory valve mounted adjacent said cylinder, a projecting strip attached to said piston and slidable in a slot in said cylinder, said projecting slip being adapted to hold said valve alternately in its extreme positions until said piston approaches the ends of its stroke, two spaced arms having resilient action and secured to said projecting strip and having their free ends straddling a projection on said valve, and means controlled by said valve for causing pulsations in said teatcups.

4. A milking machine comprising a milk receptacle, teatcups adapted to be connected with said receptacle, a cylinder mounted on said receptacle, a piston in said cylinder, an oscillatory valve mounted adjacent said cylinder, a projecting strip attached to said piston and slidable in a slot in said cylinder, said projecting strip being adapted to hold said valve alternately in its extreme positions until said piston approaches the ends of its stroke, a spring having two spaced arms secured to said projecting strip and having its free ends straddling a projection on said valve, said arms adjacent their points of attachment being bowed away from each other to provide greater resiliency, and means controlled by said valve for causing pulsations in said teatcups.

5. A milking apparatus comprising a milk receptacle, a cover for said receptacle, two sets of teatcups adapted to be connected with said receptacle, a base member attached to said cover, a horizontal cylinder secured upon said base member, an elongated piston in said cylinder, ducts connecting the end portions of said cylinder to the front of said base member, a central chamber in said base member communicating with the interior of said receptacle and from which ducts lead to the front of said base member, a pair of side chambers in said base member, two nipples connected to each of said side chambers, ducts leading from said chambers to the front of said base member, an oscillatory valve mounted on the front of said base member, said valve having two holes which register respectively and in alternation with one or the other of the ducts associated with said cylinder, and with one or the other of the ducts associated with said side chambers according to whether the valve is oscillated into one or the other of its extreme positions, said valve having upper and lower segmental recesses which connect respectively and in alternation one or the other of the ducts associated with said cylinder and one or the other of the ducts associated with said side chambers according to whether the valve is oscillated with one or the other of its extreme positions, a strip attached to said piston and slidable in a slot in said cylinder, said strip being adapted to hold said valve alternately in its extreme positions until said piston approaches the ends of its stroke, a forked spring attached to said strip and adapted to straddle a projection on said valve whereby the latter is reversed with a quick snappy action, means for maintaining a vacuum in said milk receptacle, connections between the teatcups of each of said sets and the interior of said receptacle, and connections between each of said four nipples and the pairs of teatcups which compose said two sets.

In testimony whereof we hereunto affix our signatures.

WILLIAM MORGAN.
CLARENCE J. MUCKLE.